US009791329B1

(12) United States Patent
Catalano et al.

(10) Patent No.: US 9,791,329 B1
(45) Date of Patent: Oct. 17, 2017

(54) STRUCTURE FOR CONTROLLING TENSION ON A THREADED HEADER

(71) Applicant: KULITE SEMICONDUCTOR PRODUCTS, INC., Leonia, NJ (US)

(72) Inventors: Dominic Catalano, Hawthorne, NJ (US); Sergio Radossi, Ridgefield Park, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 4 days.

(21) Appl. No.: 15/077,292

(22) Filed: Mar. 22, 2016

(51) Int. Cl.
*G01L 1/00* (2006.01)
*B23K 15/00* (2006.01)
*B23K 101/36* (2006.01)

(52) U.S. Cl.
CPC ............ *G01L 1/00* (2013.01); *B23K 15/0006* (2013.01); *B23K 15/0053* (2013.01); *B23K 2201/36* (2013.01)

(58) Field of Classification Search
CPC ......... G01L 1/00; G01L 19/14; G01L 19/147; B23K 15/00; G01R 3/00
USPC .................................................... 73/862.381
See application file for complete search history.

(56) References Cited

U.S. PATENT DOCUMENTS

| 4,492,391 | A | 1/1985 | Haines | |
|---|---|---|---|---|
| 6,612,180 | B1 | 9/2003 | Kurtz | |
| 7,198,189 | B2 | 4/2007 | Stol et al. | |
| 7,526,962 | B1* | 5/2009 | Kurtz | G01L 15/00 73/716 |
| 8,833,180 | B2* | 9/2014 | Radossi | G01L 1/00 73/850 |
| 8,863,582 | B2* | 10/2014 | Kurtz | B23K 15/04 338/36 |
| 9,205,511 | B2* | 12/2015 | Kane | G01L 1/00 |
| 2006/0065694 | A1 | 3/2006 | Stol et al. | |
| 2006/0162937 | A1 | 7/2006 | Costa et al. | |
| 2012/0160363 | A1 | 6/2012 | Jin et al. | |
| 2013/0047735 | A1* | 2/2013 | Bales | G01L 19/0681 73/706 |
| 2017/0122827 | A1* | 5/2017 | DeRosa | G01L 19/0038 |

\* cited by examiner

*Primary Examiner* — Lisa Caputo
*Assistant Examiner* — Octavia Hollington
(74) *Attorney, Agent, or Firm* — Troutman Sanders LLP; James E. Schutz; Mark Lehi Jones

(57) ABSTRACT

Certain embodiments of the disclosed technology provide systems and methods for an improved header and corresponding port associated with a transducer assembly. The header and port define mating threaded portions, thread stop portions, and a weld gap region. The thread stop portions are configured to mate and maintain a pre-loading tension between the threaded portions during and after applying a weld in the weld gap region. The weld gap region is configured to have a predetermined gap distance such that the weld seals the transducer without stress in the weld. The mating of the first and second thread stops are configured to maintain at least a portion of the pre-loading tension.

20 Claims, 5 Drawing Sheets

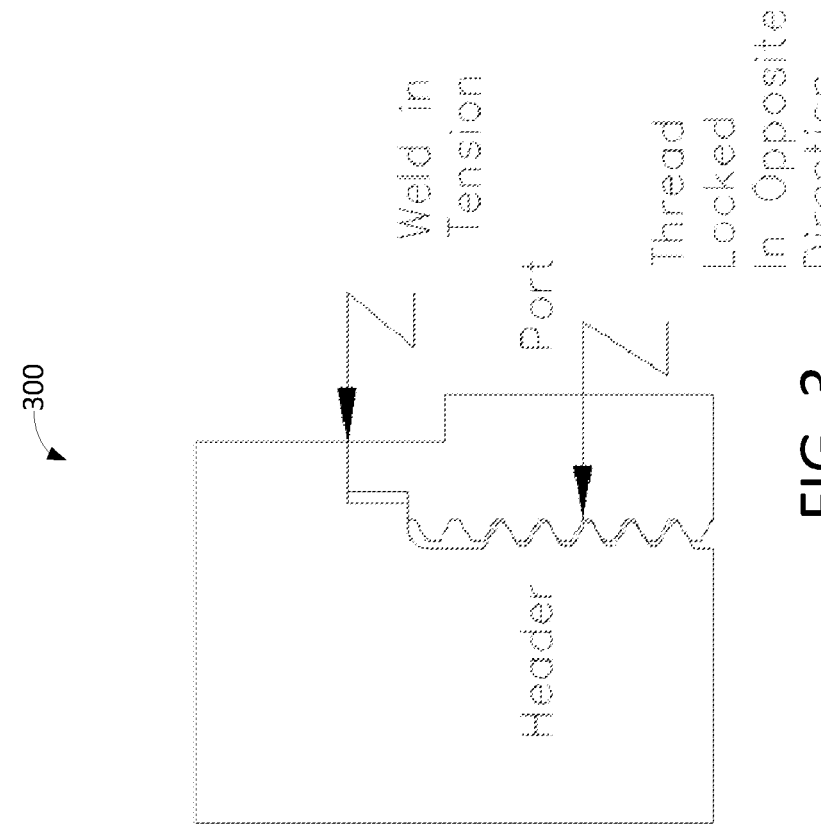

STRUCTURE FOR CONTROLLING TENSION ON A THREADED HEADER

RELATED APPLICATIONS

This application is related to U.S. Pat. No. 8,833,180, which issued 16 Sep. 2014, and is incorporated herein by reference, as if set forth in full.

TECHNICAL FIELD

The disclosed technology relates to controlling tension on a threaded header associated with a pressure transducer, and in particular, to structure assemblies and methods for controlling the tension of a threaded header during welding.

BACKGROUND

Many pressure transducer assemblies include a header portion that houses a sensing element and a port portion. An attachment between the header and port portions can enable electrical connection between the sensing element and the remaining electronic components within the pressure transducer assembly. The attachment between the header and the port also serves to seal and contain the pressure media in the measurement environment (such as in a manifold, pipe, etc.,) while isolating the electrical components from the media and further allowing assembly of the electronics within the pressure-sensing sub assembly.

Typically, the header portion is welded to the port portion. In certain prior art embodiments, the header portion includes a threaded section that mates with a corresponding threaded section on the port portion, as illustrated in FIG. 1. In this prior art embodiment, the threaded portions 125 are configured to take the load off the welded portion 130. In use, the welded portion 130 may experience stresses due to internal pressures in the design. These stresses include the hoop stress or tangential stress, and radial stress.

It was once believed that the thread would aid in removing the tensile stress from the weld area. However, several micrographs of experimental and production designs indicate that the threads may become disengaged during welding, thereby placing tensile stress on the welded area. The weld is typically an electron beam weld, and as the material melts to form the weld, a preload on the structure may be removed. Consequently, the removal of the preload during the welding process may increase the stress on the welded portion and can considerably reduce the fatigue life of the pressure transducer assembly. A need exists for an improved tensioning systems and methods.

BRIEF SUMMARY

Embodiments of the disclosed technology provide systems and methods for an improved header and corresponding port associated with a transducer assembly. In one example implementation, a transducer assembly is provided having a header and a port. The header and port define mating threaded portions, thread stop portions, and a weld gap region. The thread stop portions are configured to mate and maintain a pre-loading tension between the threaded portions during and after applying a weld in the weld gap region. The weld gap region is configured to have a predetermined gap distance such that the weld seals the transducer without transfer of the pre-loading tension stress to the weld. The mating of the first and second thread stops are configured to maintain at least a portion of the pre-loading tension.

Other embodiments provide a method for manufacturing or assembling the transducer assembly with the various components and features.

BRIEF DESCRIPTION OF THE FIGURES

Reference will now be made to the accompanying figures and flow diagrams, which are not necessarily drawn to scale, and wherein:

FIG. 2 illustrates a prior art embodiment of a header and port assembly prior to welding with a weld locked in compression and the threads engaged and locked in tension.

FIG. 3 illustrates a prior art embodiment of a header and port assembly after welding with the weld in tension and the threads unlocked.

DETAILED DESCRIPTION

Figure 1:
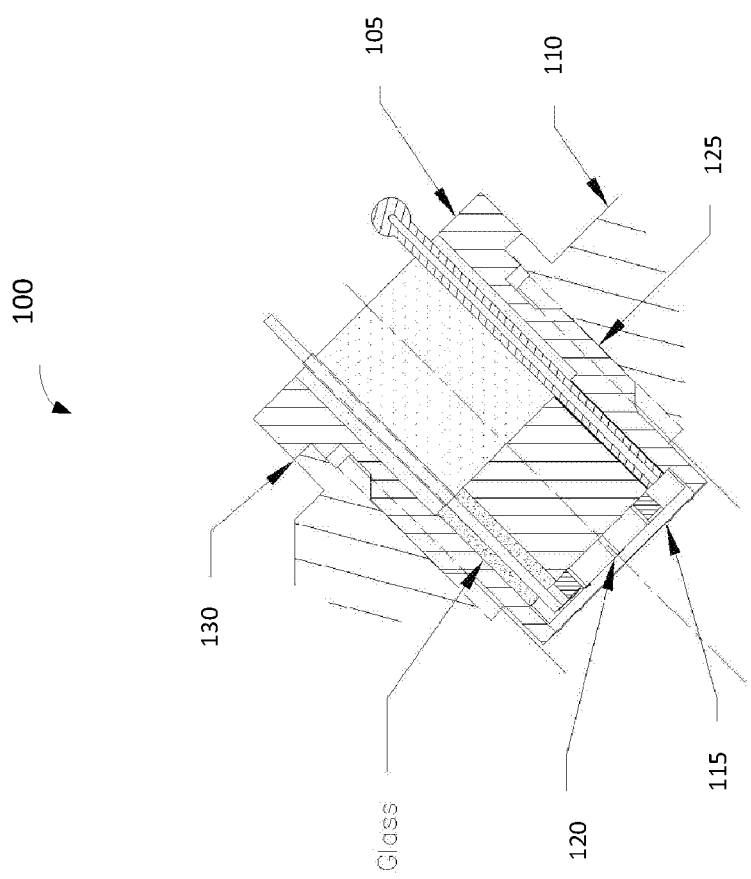
FIG. 1 illustrates a prior art embodiment of a header and port assembly without a tensioning member.

The disclosed technology provides new methods, systems, and structures to control a weld associated with a threaded header such that the heat of the weld does not release the stress applied to the threads.

As will be discussed in detail with respect the figures, the disclosed technology provides various improvements over previous designs, and may provide certain tangible advantages. For example, certain embodiments disclosed herein may enable sealing a transducer assembly with a weld. In certain example implementations, pre-tensioned stresses may be distributed and maintained at threaded and/or stop regions, while reducing stresses at the weld region. Certain example implementations may utilize a separation between the weld and stop regions so that heat from the weld does not deform the stop region or threads. Certain example configurations may utilize a joining friction at a thread stop region to hold the tension on the threads during and after the weld. In accordance with an example implementation of the disclosed technology, a predefined and uniform gap may be configured, for example, between a header and port to enable a uniform weld to be applied within the gap, while the mechanical thread stop region maintains pre-tension on the threads during welding. Certain example implementations may enable a transducer assembly to be sealed with a weld without creating tension on the weld.

According to an example implementation of the disclosed technology, the weld in gap region, as disclosed herein, may provide advantages over previous designs which have utilized welding at a metal-to-metal interface where tensioning may be applied. For example, in previous designs, if the welding temperature exceeds or is substantially near the melting point of the header or port materials, it may melt the thread stops and transfer stress to the weld. Certain example implementations, as disclosed, help overcome this drawback.

Although preferred embodiments of the disclosed technology are explained in detail, it is to be understood that other embodiments are contemplated. Accordingly, it is not intended that the disclosed technology is limited in its scope to the details of construction and arrangement of components set forth in the following description or illustrated in the drawings. The disclosed technology is capable of other embodiments and of being practiced or carried out in various ways. Also, in describing the preferred embodiments, specific terminology will be resorted to for the sake of clarity.

As used in the specification and the appended claims, the singular forms "a," "an," and "the" include plural referents unless the context clearly dictates otherwise.

In describing preferred embodiments, terminology will be resorted to for the sake of clarity. It is intended that each term contemplates its broadest meaning as understood by those skilled in the art and includes all technical equivalents which operate in a similar manner to accomplish a similar purpose.

By the terms "comprising" or "containing" or "including," is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the figures, in which like numerals represent like elements, certain example embodiments of the disclosed technology are described. It is to be understood that the figures and descriptions of the disclosed technology have been simplified to illustrate elements that are relevant for a clear understanding of the disclosed technology, while eliminating, for purposes of clarity, many other elements found in typical pressure sensor assemblies and methods of making and using the same. Those of ordinary skill in the art will recognize that other elements are desirable and/or required in order to implement the disclosed technology. However, because such elements are well known in the art, and because they do not facilitate a better understanding of the disclosed technology, a discussion of such elements is not provided herein.

Figure 5:
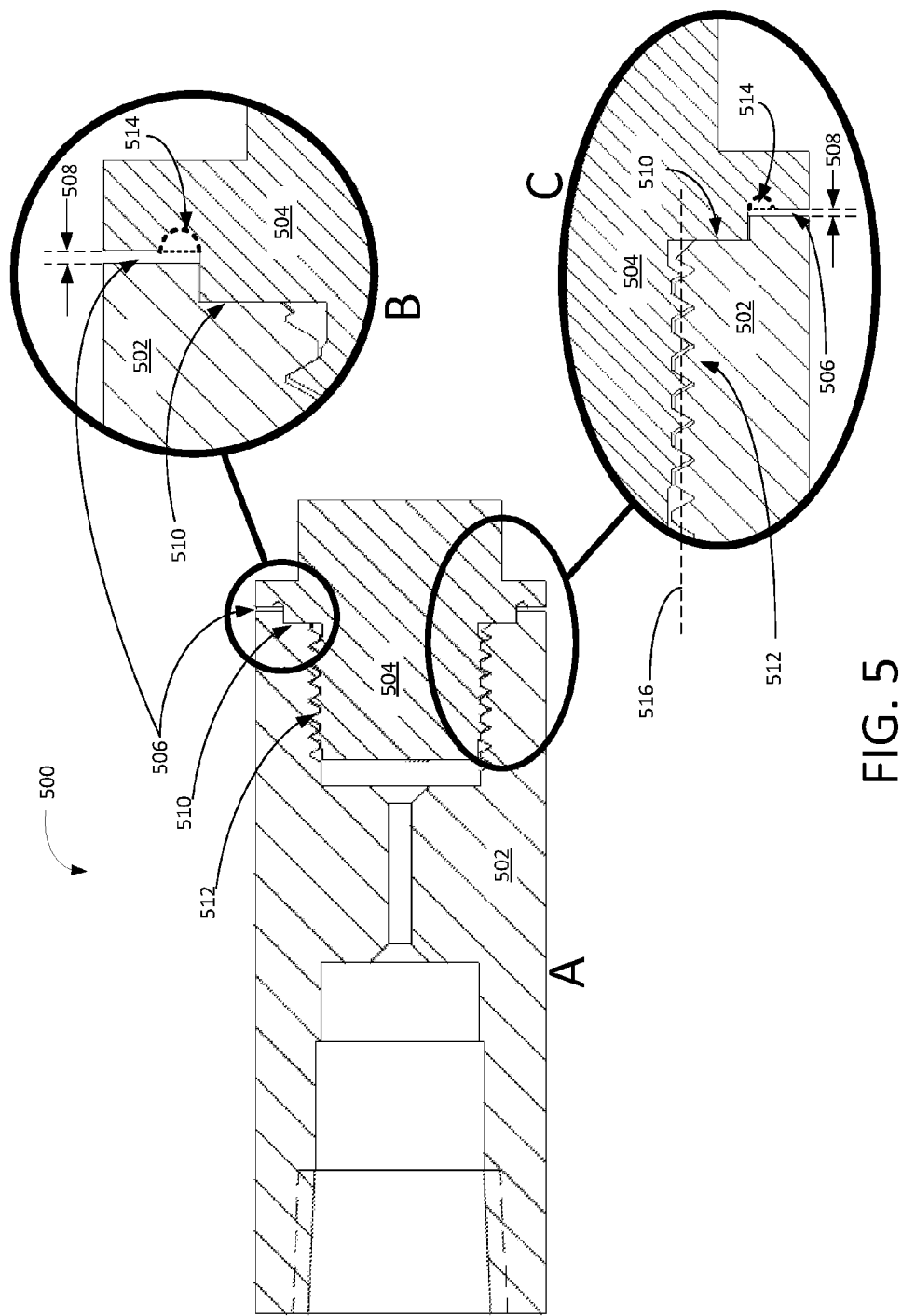
FIG. 5 illustrates exemplary embodiment of a header and port assembly according to an example implementation of the disclosed technology.
Figure 6:
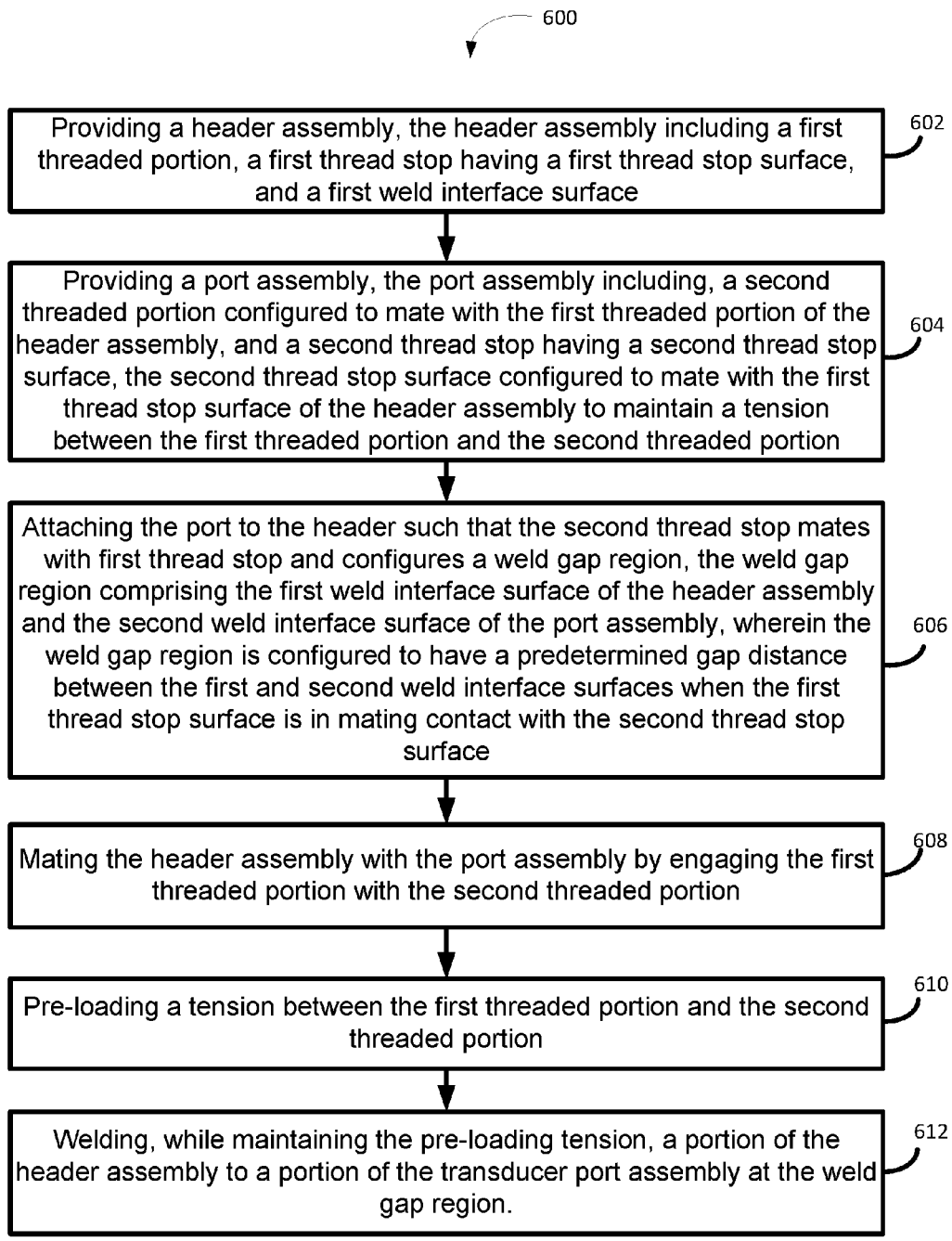
FIG. 6 is a flow diagram of a method, according to an example implementation of the disclosed technology.

FIGS. 1-4 and the associated discussions below provide a description of the prior art embodiments to aid in the understanding of some of the associated issues. FIG. 5 and FIG. 6, with associated discussion provide details of the presently disclosed technology.

Referring to the prior art embodiment of FIG. 1, a header assembly 105 is connected to a corresponding port assembly 110. As illustrated in this embodiment, the header assembly 105 can include an isolation diaphragm 115 adapted to receive an incoming pressure stream, and a sensing die plate 120 adapted to transmit a signal indicative of the incoming pressure stream. The header assembly 105 may be inserted into a corresponding port assembly 110 via corresponding threading portions 125. For example, the header assembly 105 includes a first threaded portion, and the port assembly 110 includes a second threaded portion that correspondingly mates with the first threading portion. To connect the header assembly 105 to the port assembly 110, the header assembly 105 may be threaded into the port assembly 110 such that the first threaded portion of the header assembly 105 engages the second threaded portion of the port assembly 110, thereby creating threaded portions 125. To further support the connection between the header assembly 105 and the port assembly 110, a connecting weld 130 is applied at a header-port interface, which is the same interface that is relied upon for applying stress to the threaded portions 125.

Initially the header 105 is threaded into the port 110 and compression is applied to the threads 125 when the base of the header 130 makes contact with the port. However, when a weld is made at the base of the header 130 the heat from the weld can relax the tension on the threads. When the structure cools down, the compression in the threads is relieved and the preloading support to weld is reduced or eliminated.

Referring now to FIG. 2 and FIG. 3, which depict prior art embodiments of a header assembly and corresponding port assembly before and after welding, respectively. To connect the header assembly to the corresponding port assembly, a first threaded portion on the header assembly engages a second threaded portion on the port assembly. A torque is applied to the first threaded portion to engage a thread stop on the second threaded portion. Once the thread stop is engaged, a compression is applied to the thread stop, which consequently imparts tension to the first and second threaded portions, as depicted in FIG. 2. After threading, it may be desirable to weld the header assembly to the port assembly at a location substantially adjacent the thread stop, which may consequently compromise the tension between the first and second threaded portions. To connect the header assembly securely to the port assembly, however, it is useful for the first and second threaded portions to remain in tension. If the tension between the first and second threaded portions is compromised, additional stress may be carried by the weld joint, which may reduce the lifespan of the assembly, as further described below.

As shown in the prior art depiction of FIG. 3, the header assembly may be secured to the port assembly by weld, which can result in tension on the weld joint between the first and second threaded portions. Specifically, the header and port assemblies are often constructed of metals having melting points lower than or around the same temperature as the welding temperature. In many prior art embodiments, the thread stop is located near the location of the weld. This close proximity often times causes the thread stop to melt during welding, which consequently compromises the tension between the engaged threaded portions. When the tension between the first and second threaded portion is compromised, the tension is transferred to the welded portion, which increases the likelihood of crack propagation and consequently reduces the lifespan of the overall assembly.

Figure 4:
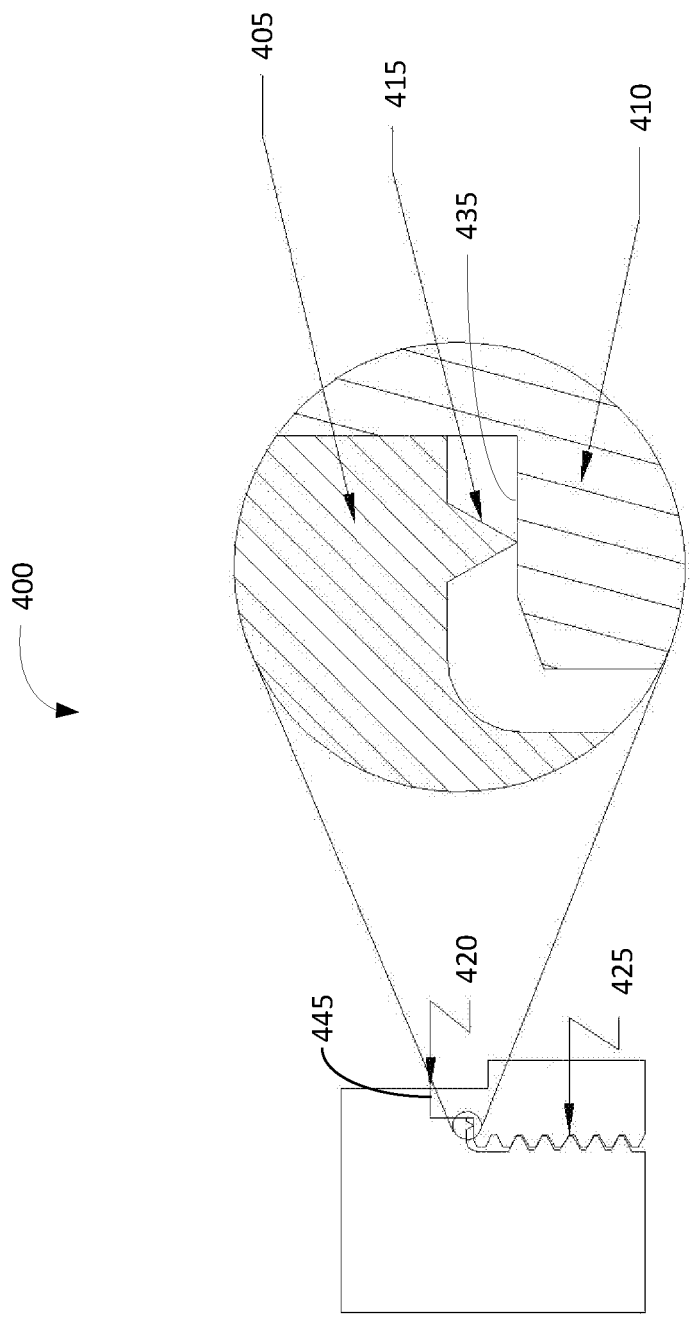
FIG. 4 illustrates a prior art embodiment of a header and port assembly that includes a tensioning member.

FIG. 4 illustrates a prior art embodiment of a header assembly 405 and a corresponding port assembly 410 as disclosed in U.S. Pat. No. 8,833,180, incorporated herein by reference. As shown, this embodiment provides an added tensioning member 415, which is designed to engage with a first thread stop 435, for example, to keep the threads 425 in compression during a weld. The weld is made at a second thread stop 445 at or near the access point interface 420 between the header assembly 405 and the port assembly 410. This type of structure may work well for some configurations, but it can be difficult to make a suitable structure in some implementations. Thus, a need exists for improved tensioning systems and methods.

FIG. 5 illustrates an exemplary embodiment of a pressure sensor assembly 500 that includes a header assembly 502 and a port assembly 504, according to an example implementation of the disclosed technology. Certain example implementations may be utilized to solve thread tensioning and welding issues, as previously discussed. FIG. 5 depicts the pressure sensor assembly 500 (diagram "A") with magnified views of the gap region 506 and the stop region 510 (inset diagram "B"), and threads 512 (inset diagram "C"). The gap region 506 is not drawn to scale, but is exaggerated in FIG. 5 to illustrate certain concepts associated with the improved tensioning systems and methods.

In accordance with an example implementation, the pressure sensor assembly 500 may have two separate interfaces. The control and configuration of these interfaces are addressed in certain example implementations of the disclosed technology. The first interface is the stop region 510 where the header 502 and the port 504 make contact when the header 502 is threaded 512 into the port 504. The surface of the stop region 510 may provide pre-loading stresses for threads 512 as the header 502 and the port 504 make contact. In accordance with an example implementation of the disclosed technology, this surface associated with the stop region 510 may be roughened or textured to control the amount of force that is needed to tighten/loosen the threads 512.

The second interface is the gap region 506 between the header 502 and the port 506. In accordance with an example implementation of the disclosed technology, the gap region 506 may be configured to have a controlled gap of a finite gap distance 508 between the associated surfaces of the header 502 and the port 504 within this gap region 506. For example, geometry of the header 502 and port 504 may be configured such that a finite gap distance 508 results when the header 502 and the port 504 make contact at the stop region 510. The control of the gap distance 508 may be configured by carefully controlling the distance between the two interfaces both on the header 502 and port 504. For example, the header 502 may include a first thread stop surface and a first weld interface surface separated by a first (longitudinal) distance. The port 504 may have a second thread stop surface and a second weld interface surface separated by a second (longitudinal) distance that is greater than the first (longitudinal) distance. In an example implementation, the difference between the second distance and the first distance may be configured to be about equal to the desired weld gap distance 508. In this way, when the first thread stop surface is in mating contact with the second thread stop surface, the desired weld gap distance is defined.

In accordance with an example implementation of the disclosed technology, when the header 502 and port 504 contact at the stop region 510, the threads 512 may be brought into tension contact such that the small gap in the gap region 506 is maintained during welding. In certain example implementations, the gap distance 508 may be configured to be between about 0.001" and about 0.010" when the header 502 and port 504 contact at the stop region 510. In one example implementation, the gap distance 508 may be configured to be between about 0.0005" and about 0.003". In another example implementation, the gap distance 508 may be configured to be between about 0.002" and about 0.004". In another example implementation, the gap distance 508 may be configured to be between about 0.003" and about 0.005". In another example implementation, the gap distance 508 may be configured to be between about 0.004" and about 0.006". In another example implementation, the gap distance 508 may be configured to be between about 0.005" and about 0.007". In another example implementation, the gap distance 508 may be configured to be between about 0.006" and about 0.008". In another example implementation, the gap distance 508 may be configured to be between about 0.007" and about 0.009". In another example implementation, the gap distance 508 may be configured to be between about 0.008" and about 0.010". In another example implementation, the gap distance 508 may be configured to be between about 0.009" and about 0.011". In yet another example implementation, the gap distance 508 may be configured to be between about 0.01" and about 0.015". Additionally, in accordance with certain other implementations, the gap distance 508 may be configured to achieve certain desired weld characteristics based on the materials used and the dimensions of the components.

In accordance with an example implementation of the disclosed technology, a weld may be applied at the gap region 506 interface such that the gap region 506 is filled, or substantially filled, by the weld material. In accordance with an example implementation of the disclosed technology, when the weld is applied, the gap region 506 may be filled with the weld material such that the weld material also bonds to the associated interfaces. In an example implementation, the weld may provide the seal without transferring enough heat to deform the interface at the stop region 510, for example, so that the welding does not significantly affect the pre-tension in the threads 512. In certain example implementations, by controlling one or more of: the gap distance 508, the distance of the gap region 506 from the stop region 510, and the welding process, the pre-tension can remain predominately concentrated in the region of the threads 512, while reducing tension at the weld joint.

In certain example implementations, the weld may be controlled and applied to completely fill the gap region 506 around the entire circumference of the header 502 such that there are no leaks. According to an example implementation of the disclosed technology, the weld may seal the header 502 to the port 504 to prevent leaks, while the majority of the stress from the pressure applied to the header 502 may be distributed in the region at and around the threads 512 rather than at the weld. This may be made possible by keeping a very consistent gap distance 508 between the two opposing surfaces at the interface of the gap region 506.

In accordance with an example implementation of the disclosed technology, the geometry of the header 502 and the port 504 may be configured such that the midline 516 of the threads 512 along the threaded portion are coaxially aligned around the circumference of the threaded portion. For example, the midline 516 of the (inward facing) threaded portion of the header 502 and the midline 516 of the (outward facing) threaded portion of the port 504 may be parallel to provide a uniform tensioning. In accordance with an example implementation of the disclosed technology, the threads 512 may be configured with respective facing thread segment surfaces that are parallel with one another to provide uniform and/or maximal surface contact with one another.

In certain example implementations, welding parameters may change as a function of the gap distance 508. Thus, in certain example implementations, the gap distance 508 may be controlled so that it is uniform around the entire circumference of the assembly 500, which may enable the application of a uniform weld.

In accordance with an example implementation of the disclosed technology, the geometry of the header 502 and port 504 may be configured such that the contacting interface at the stop region 510 has a large enough surface area to provide adequate friction to hold the threads in tension. In one example implementation, the difference ($\Delta r$) between an outer contacting radius and an inner contacting radius of the stop region 510 may be configured to be between approximately 0.05" and approximately 0.15". In another example implementations, $\Delta r$ may be configured to be between about 0.15" and about 0.025". As previously discussed, a surface roughness or texturing may be utilized on one or more surfaces of the contacting interface at the stop region 510 to enhance the holding friction, for example so that Δr may be reduced.

In one example implementation of the disclosed technology, an optional welding relief undercut 514 may be configured, as shown by the dashed semi-circle in the gap region 506 of FIG. 5. According to an example implementation of the disclosed technology, this undercut 514 may be utilized to enhance or assist the welding process. For example, in one implementation, the undercut 514 may provide a region for additional weld material and/or heat to flow during the weld. Certain example implementations may omit the undercut 514.

The disclosed technology provides various improvements over previous designs, and may provide certain tangible advantages and technical benefits over previous systems. Such technical benefits may include, but are not limited to one or more of: (1) weld heat may be primarily concentrated at the gap region 506 and dissipated via the assembly 500 so that the joining friction at the stop region 510 is maintained to hold the tension on the threads 512 during and after the welding process; (2) the definition of a predefined and uniform gap distance 508 at the gap region 506 interface between the header 502 and port 504 enables a uniform weld to be applied; and (3) the mechanical stop region 510 to maintain pre-tension on the threads 512, combined with the gap region 506 allows the weld in gap region 506 to seal the assembly 500 without placing material tension on the weld.

As may also be appreciated by those having skill in the art, the additional benefit of the weld in gap region 506, as disclosed herein, may provide significant advantages over previous designs, which have utilized welding at a metal-to-metal abutting interface. For example, in previous designs, if the welding temperature exceeds or is substantially near the melting point of the header or port materials, it may melt the thread stops or stop member and transfer stress to the weld. Certain example implementations, as disclosed, help overcome this drawback.

Certain example implementations of the disclosed technology can provide a header assembly and corresponding port assembly that may be constructed of metals having lower or substantially similar melting temperatures as the welding temperature, can withstand stress caused by the act of welding, and be able to maintain the tension between engaged threaded portions of the header and port assemblies before, during, and after welding, thereby maintaining the integrity of the overall structure and reducing stress on the weld.

FIG. 6 is a flow diagram of a method 600 for assembling a transducer. In block 602, the method 600 includes providing a header assembly, the header assembly including: a first threaded portion; a first thread stop having a first thread stop surface; and a first weld interface surface. In block 604, the method 600 includes providing a port assembly, the port assembly including: a second threaded portion configured to mate with the first threaded portion of the header assembly; and a second thread stop having a second thread stop surface, the second thread stop surface configured to mate with the first thread stop surface of the header assembly to maintain a tension between the first threaded portion and the second threaded portion. In block 606, the method 600 includes defining a weld gap region, the weld gap region comprising the first weld interface surface of the header assembly and the second weld interface surface of the port assembly, wherein the weld gap region is configured to have a predetermined gap distance between the first and second weld interface surfaces when the first thread stop surface is in mating contact with the second thread stop surface. In block 608, the method 600 includes mating the header assembly with the port assembly by engaging the first threaded portion with the second threaded portion. In block 610, the method 600 includes pre-loading a tension between the first threaded portion and the second threaded portion. In block 612, the method 600 includes welding, while maintaining the pre-loading tension, a portion of the header assembly to a portion of the transducer port assembly at the weld gap region.

Certain example implementations may further include providing a separation between the weld gap region and at least the first thread stop such that the tension between the first threaded portion and the second threaded portion is substantially maintained during and after the welding. In an example implementation, the separation provides a temperature differential between the weld gap region and the first and second thread stops during the welding, for example, so that the weld does not deform the thread stops or threads.

According to an example implementation of the disclosed technology, at least a portion of the weld gap region is filled with weld material during the welding.

In certain example implementations, a gap region may be defined. For example, and according to certain embodiments, a distance from the first thread stop to the first weld interface surface may be less than a distance from the second thread stop to the second weld interface surface.

In certain example implementations, the first thread stop surface is configured to provide a mating friction with the second thread stop surface to maintain the tension between the first threaded portion and the second threaded portion.

In certain example implementations, one or more of the first thread stop surface and the second thread stop surface comprising a surface roughness to enhance the mating friction.

Certain example implementations, include defining an optional undercut feature in one or more of the a first weld interface surface and second weld interface surface to provide a region for one or more of weld material and heat to flow during welding.

In certain example implementations, the header and port assemblies are constructed of metals having lower or substantially similar melting temperatures as a temperature of the welding.

In an example implementation, the pre-loading the tension between the first threaded portion and the second threaded portion comprises applying a torque between the header assembly and the port assembly.

In accordance with an example implementation of the disclosed technology, the header assembly includes a pressure sensor.

While certain implementations of the disclosed technology have been described in connection with what is presently considered to be the most practical implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It will be apparent to those skilled in the art that modifications and variations may be made in the apparatus of the disclosed technology without departing from the spirit or scope of the disclosed technology. It is intended that the disclosed technology cover the modification and variations of this disclosed technology provided they come within the scope of the appended claims and their equivalents.

What is claimed is:

1. A transducer assembly, comprising:
   a header assembly, the header assembly including:
      a first threaded portion;
      a first thread stop having a first thread stop surface; and
      a first weld interface surface;
   a port assembly, the port assembly including:
      a second threaded portion configured to mate with the first threaded portion of the header assembly;
      a second thread stop having a second thread stop surface, the second thread stop surface configured to mate with the first thread stop surface of the header assembly to maintain a tension between the first threaded portion and the second threaded portion;
   a weld gap region, the weld gap region comprising the first weld interface surface of the header assembly and the second weld interface surface of the port assembly, wherein the weld gap region is configured to have a predetermined gap distance between the first and second weld interface surfaces when the first thread stop surface is in mating contact with the second thread stop surface; and
   a weld in the weld gap region;
   wherein the first threaded portion and the second threaded portion are configured with a pre-loading tension; and
   wherein the weld is configured to seal the transducer assembly while the mating of the first and second thread stops are configured to maintain at least a portion of the pre-loading tension.

2. The transducer assembly of claim 1, wherein one or more of the header and port assembly defines a separation between the weld gap region and at least the first thread stop such that the tension between the first threaded portion and the second threaded portion is substantially maintained during and after application of the weld.

3. The transducer assembly of claim 1, wherein the weld gap region comprises a gap of between about 0.001" and about 0.010" between the first and second weld interface surfaces.

4. The transducer assembly of claim 1, wherein a distance from the first thread stop to the first weld interface surface is less than a distance from the second thread stop to the second weld interface surface.

5. The transducer assembly of claim 1, wherein the first thread stop surface is configured to provide a mating friction with the second thread stop surface to maintain the tension between the first threaded portion and the second threaded portion.

6. The transducer assembly of claim 5, wherein one or more of the first thread stop surface and the second thread stop surface comprises a surface roughness to enhance the mating friction.

7. The transducer assembly of claim 1, further comprising an undercut feature defined in one or more of the a first weld interface surface and second weld interface surface to provide a region for one or more of weld material and heat to flow during application of the weld.

8. The transducer assembly of claim 1, wherein the header and port assemblies are constructed of metals having lower or substantially similar melting temperatures as a temperature applied during application of the weld.

9. The transducer assembly of claim 1, wherein pre-loading the tension between the first threaded portion and the second threaded portion comprises applying a torque between the header assembly and the port assembly.

10. The transducer assembly of claim 1, wherein the header assembly includes a pressure sensor.

11. A method, comprising:
    providing a header assembly, the header assembly including:
       a first threaded portion;
       a first thread stop having a first thread stop surface; and
       a first weld interface surface;
    providing a port assembly, the port assembly including:
       a second threaded portion configured to mate with the first threaded portion of the header assembly; and
       a second thread stop having a second thread stop surface, the second thread stop surface configured to mate with the first thread stop surface of the header assembly to maintain a tension between the first threaded portion and the second threaded portion;
    attaching the port to the header such that the second thread stop mates with first thread stop and configures a weld gap region, the weld gap region comprising the first weld interface surface of the header assembly and the second weld interface surface of the port assembly, wherein the weld gap region is configured to have a predetermined gap distance between the first and second weld interface surfaces when the first thread stop surface is in mating contact with the second thread stop surface;
    mating the header assembly with the port assembly by engaging the first threaded portion with the second threaded portion;
    pre-loading a tension between the first threaded portion and the second threaded portion; and
    welding, while maintaining the pre-loading tension, a portion of the header assembly to a portion of the port assembly at the weld gap region.

12. The method of claim 11, further comprising providing a separation between the weld gap region and at least the first thread stop such that the tension between the first threaded portion and the second threaded portion is substantially maintained during and after the welding.

13. The method of claim 12, wherein the separation provides a temperature differential between the weld gap region and the first and second thread stops during the welding.

14. The method of claim 11, wherein at least a portion of the weld gap region is at least partially filled with weld material during the welding.

15. The method of claim 11, wherein the first thread stop surface is configured to provide a mating friction with the second thread stop surface to maintain the tension between the first threaded portion and the second threaded portion.

16. The method of claim 15, wherein one or more of the first thread stop surface and the second thread stop surface comprises a surface roughness to enhance the mating friction.

17. The method of claim 11, further comprising defining an undercut feature in one or more of the a first weld interface surface and second weld interface surface to provide a region for one or more of weld material and heat to flow during the welding.

18. The method of claim 11, wherein the header and port assemblies are constructed of metals having lower or substantially similar melting temperatures as a temperature of the welding.

19. The method of claim 11, wherein pre-loading the tension between the first threaded portion and the second threaded portion comprises applying a torque between the header assembly and the port assembly.

20. The method of claim 11, wherein the header assembly includes a pressure sensor.

* * * * *